2,949,927
RESILIENT INFLATION-DEFLATION VALVE

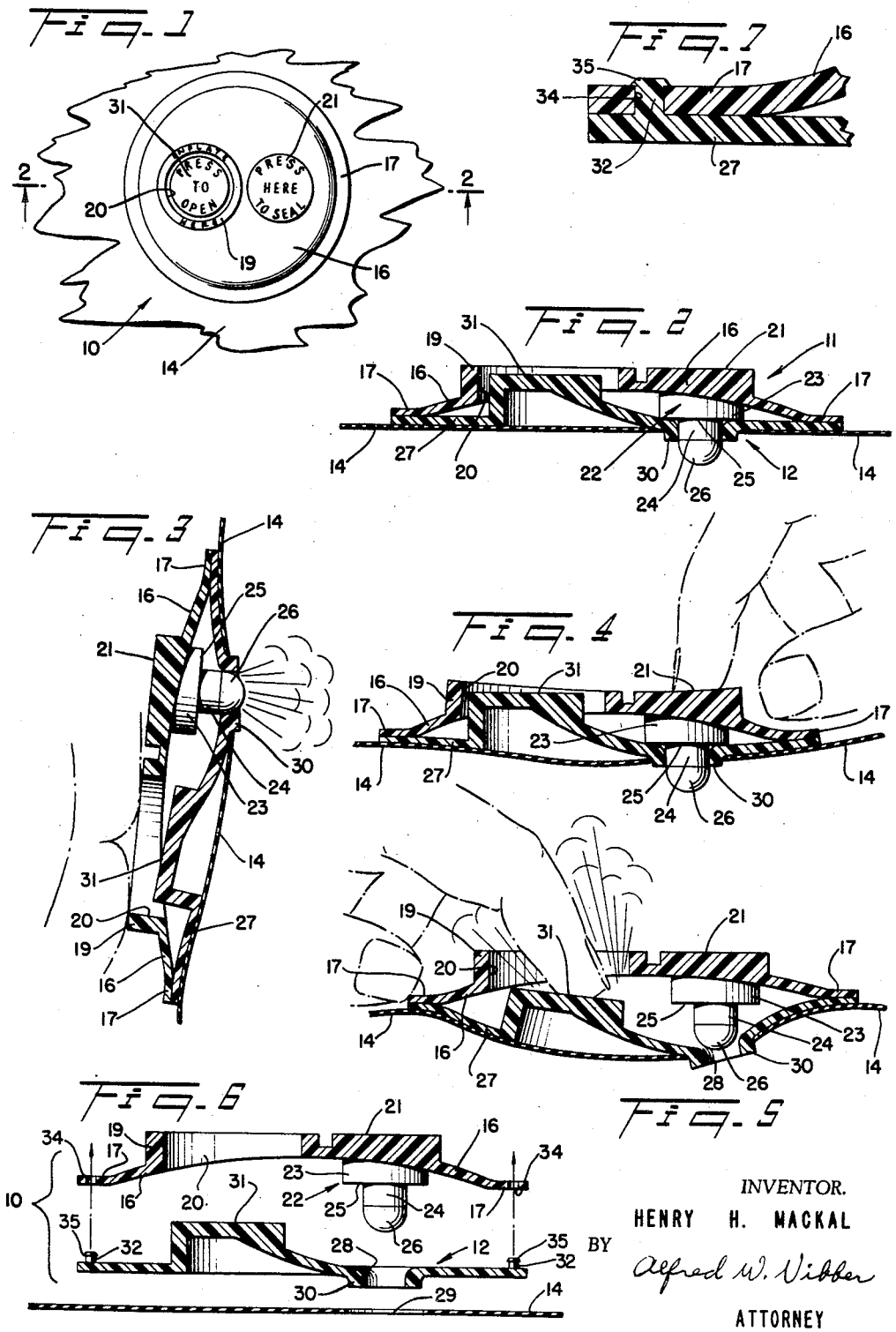
Aug. 23, 1960     H. H. MACKAL     2,949,927
RESILIENT INFLATION-DEFLATION VALVE
Filed Oct. 10, 1957
INVENTOR.
HENRY H. MACKAL
BY Alfred W. Vibber
ATTORNEY

United States Patent Office 2,949,927
Patented Aug. 23, 1960

Henry H. Mackal, E. 37 Spring Valley Ave., Paramus, N.J.

Filed Oct. 10, 1957, Ser. No. 689,389

13 Claims. (Cl. 137—223)

This invention relates to a valve, such valve being advantageously employed with inflatable articles although it is not limited to such use.

The invention has among its objects the provision of an improved novel valve of the type indicated which is simple, rugged, economical to make, and is of low height or profile.

A further object of the invention is to provide a valve which is easily installed and facilely operated.

Yet another object is the provision of a valve which is self-opening and closing for check valve operation.

Still another object is to provide a valve which may readily be manually opened and closed.

Still further objects are to provide a valve which is advantageously molded of plastic material, a valve which may be made with two pieces only, and a valve which is non-clogging and self-cleaning.

Other objects are the provision of a valve which is manually push-button operated, in which the inflation and deflation opening is laterally removed from the location of the manually operated means for closing the valve whereby there need be no loss of fluid from the article between the cessation of the application of article-inflating pressure and the manual sealing of the article, and which may also operate as a relief valve in certain installations of the valve.

The above and further objects and novel features of the invention will more fully appear from the following description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views:

Fig. 1 is a view in plan of an illustrative valve made in accordance with the invention, such valve being shown in closed position and mounted on the wall of a fragmentarily shown inflatable article;

Fig. 2 is a view in transverse section through the valve in closed position, the section being taken generally along line 2—2 of Fig. 1;

Fig. 3 is a view in transverse section similar to Fig. 2, but with the valve parts in the position which they assume after having been manually opened preliminary to and during an article-inflating operation;

Fig. 4 is a view in transverse section similar to Figs. 2 and 3, but showing the valve parts at the end of a manual valve-closing operation;

Fig. 5 is a view in transverse section similar to Fig. 4 but showing the valve manually opened to deflate the article with which it is employed.

Fig. 6 is an exploded view in section through the valve and a fragment of wall of the article to which it is to be attached, the parts being shown in alignment prior to their being sealed together; and Fig. 7 is a fragmentary view in section through a portion of the rim of the assembled valve parts prior to their being sealed to each other and to the wall of an inflatable article.

The illustrative embodiment of the valve is primarily adopted for use with an inflatable hollow article to which it is attached, whereby the article may be inflated and deflated therethrough. As above indicated, however, the valve of the invention may be employed to advantage in a wide variety of other applications, and for other purposes.

In the drawings, the valve is designated generally by the reference character 10, and the wall of the inflatable article is designated 14. In the illustrative embodiment, the valve may be attached to the wall 14 as by being heat-sealed thereto, but it is obvious that the valve may be sealingly secured to the article in other ways.

Valve 10 has two main parts: an outer or upper shallowly domed plate part 11, and an inner or lower plate part 12 located in alignment with part 11 and between it and the wall 14 of the inflatable article. The parts 11 and 12 together form a valve of low external profile, which adds a relatively small amount to the generally radial outer dimension of the article. Preferably, although not necessarily, both parts 11 and 12 of the valve are made of heat-sealable plastic material whereby they may be heat-sealed together and to the wall 14 of the article, assuming that the latter is also made of heat-sealable material. When the outer valve part 11 is made of plastic material, such material is relatively rigid; a plastic material having a 90 durometer hardness is satisfactory for part 11.

Valve part 11 has a shallowly domed wall 16 which is circular in plan, wall 16 having an annular rim 17 by which part 11 may be attached and sealed to the inner valve part 12. Spaced inwardly on the rim 17 the wall 16 has a hollow boss or an annular thickened rim portion 19 having a central opening 20 therethrough. Opening 20 serves as an inflating and deflating passage through the wall 16 of valve part 11. Adjacent boss 19, and having its center lying on the same diameter as rim 19 and opening 20, is a boss or button member 21 by means of which the valve may be manually closed in a manner to be explained. Generally coaxial with button 21, and integrally connected to the bottom thereof, is a valve stem member generally designated 22. Member 22 has an upper, larger diametered cylindrical part 23, and a lower, somewhat smaller cylindrical part 24 coaxial therewith, there being an abrupt shoulder 25 between parts 23 and 24. The lower end 26 of part 24 is shown as being of semi-spherical form. This improves its check valve action, as will be explained, and facilitates entry of the valve stem into the valve opening or port 28 in the lower, inner valve part 12.

The inner valve part 12 has a body 27 which is circular in plan and is of the same diameter as valve part 11. The main extent of valve part 12 is generally flat and is adapted to lie upon the outer surface of wall 14 of the inflatable article. Body 27 has an opening or port 28 therein axially aligned with, but of somewhat smaller diameter than, the diameter of lower part 24 of stem 22. The lower surface of body 27 has a hollow boss 30 which surrounds port 28. The wall 14 of the inflatable article is provided with a hole 29 therethrough which receives the inner end of boss 30. Hole 29 is of the same diameter as the outer diameter of boss 30. This serves to locate the valve properly on the inflatable article during assembly. The inner valve part 12 is made of a relatively soft but self-sustaining elastomeric plastic material. A plastic material of such character having a hardness of 60 durometer has proved to be satisfactory for valve part 12.

As a result of the disposition and relative sizes of stem part 24 and port 28, when the stem part 24 extends into opening 28, the boss 30 on valve part 12 surrounding opening 28 is stretched radially outwardly, thereby providing an extended zone of sealing between valve part 12 and stem 22. When the valve parts are in "check" position, that is, when valve stem 22 is positioned outwardly of or above opening 28, and the interior of the valve is subjected to atmospheric pressure, the resilience of the parts normally maintains the lower end 26 of stem 22 in intimate contact with the upper or outer surface of body 27 of valve part 12 surrounding opening 28, thereby substantially to seal such opening. When the interior of the valve is subjected to increased pressure, as by mouth inflation as indicated in Fig. 3, the inner part 12 of the valve moves inwardly a short distance to allow the flow of air into the inflatable article.

The body 27 of valve part 12 is provided with an internally hollow outwardly raised button 31 integral therewith whereby the stem 22 may be manually retracted from the closed position of Fig. 2 to its above described check position. Button 31 is of somewhat conoidal shape, and has an outer smaller end of somewhat smaller diameter than opening 20 in valve part 11 and lying generally coaxially thereof. In the embodiment shown the outer end of button 31 lies somewhat below or inwardly of the outer surface of hollow boss 19 when the parts are in the position of Fig. 2.

Valve parts 11 and 12 are preferably molded separately and are assembled and sealed to each other and to the wall of the inflatable article in the same sealing operation. To insure the correct location of valve parts 11 and 12 relative to each other, such parts are preferably provided with means whereby they may be held in assembled relationship prior to their attachment to the inflatable article. In the illustrative embodiment such means takes the form of a two short upstanding pins 32 angularly spaced about the rim of the inner valve part 12. Rim 17 of valve part 11 is provided with two holes 34 so spaced and of such size as snugly to receive the pins 32 therein. In order that the pins will be firmly retained in holes 34, the heads of the pins may be somewhat enlarged, as shown at 35 and the pins may be somewhat longer than the thickness of the rim 17, whereby heads 35 are resiliently deformed as they pass through holes 34 and expand when they have passed through the holes. When valve parts 11 and 12 are sealed to each other and to the inflatable article, as by an electronically heated die shaped to engage rim 17, the protruding ends of pins 32 are melted down to the general level of the outer surface of rim 17 and the pins are integrally sealed to rim 17.

The manner of operation of the valve will be apparent from the above description thereof and of the drawings. However, such operation, and the advantages possessed by the valve, will be briefly described below.

Let us assume that the inflatable article is air inflatable by mouth, that it is either deflated or underinflated, and that the valve parts are in the fully closed, sealing position of Fig. 2. The operator first inserts a finger into opening 20 in the outer valve part and depresses button 31, thereby inwardly bulging the wall 27 of inner valve part 12 so as to push the material thereof surrounding opening 28 down along part 24 of stem 22 until such material lies inwardly of the free end of stem part 24. When button 31 is released, the resilience of valve part 12 returns it to a position generally the same as that shown in Fig. 3, wherein the material of body 27 surrounding hole 28 is urged into engagment with the rounded end 26 of stem 22. The greater stiffness of the outer valve part 11 causes it to remain substantially unflexed during the above valve-opening operation.

In the position of Fig. 3 the valve functions as a check valve, permitting the introduction of fluid into the inflatable article and preventing the escape of fluid therefrom. Thus, little or no fluid is lost from the article, assuming that it is already inflated, when the valve is opened from the position of Fig. 2 to that of Fig. 3. When the article is already inflated to some extent, the fluid pressure within the article tends to press the inner valve part 12 outwardly, so that the portion thereof surrounding hole 28 still more forcibly engages end surface 26 of stem part 24. The size of opening 28 and the resistance to deformation of the portion of body 27 surrounding opening 28 are preferably so chosen that under the normal maximum fluid pressure in the inflatable article the parts will not return by themselves to the fully closed and sealed position of Fig. 2.

After the valve has been placed in the position of Fig. 3, the article may be inflated or additionally inflated. The article is brought to the operator's mouth with the opening 20 in the valve against his lips, as indicated in Fig. 3.

The operator then blows into opening 20 to inflate the article. At the end of each inflating puff it is unnecessary to close opening 20, as with the tongue, since when pressure is reduced outwardly of opening 20 the resilience of the inner valve body 12, plus the air pressure within the article, immediately restore the valve to the check position of Fig. 3. When the article has been inflated to the desired pressure, the operator depresses button 21 with his finger, thereby restoring the valve to the fully closed and sealed position of Fig. 2. Such manual closing of the valve may be carried out, without loss of air after the valve has been moved away from the operator's mouth.

In such manual closing and sealing operation, depression of button 21 causes the outer valve part 11 to be flattened somewhat, thereby causing portion 24 of stem 22 to enter hole 28 in wall 27 of valve part 12 until shoulder 25 between parts 23 and 24 of stem 22 engages the upper surface of body 27 around hole 28. The flattening of the arch of the domed wall 16 of valve part 11, when button 21 is thus depressed, places body 27 of the inner valve part under tension, thereby additionally urging the parts into the position of Fig. 2. The air pressure within the article also aids in the described valve closing and sealing action. In the fully closed position of the valve, Fig. 2, the portion 30 of body 27 of the inner valve part frictionally engages portion 26 of stem 22 with sufficient force to prevent the opening of the valve under normal pressure conditions within the article.

The valve is of advantage in numerous applications such as inflatable articles subjected to impact, since the button 31, by which it may be deliberately deflated or placed in inflating "check" position, is located beneath the level of the outer surface of the outer valve part. Pressures or impacts upon the outer surface of the valve only tend momentarily to flatten the arch of the outer valve part, and thus to thrust shoulder 25 on the stem 22 more forcibly against the body 27 of the lower valve part.

The valve is particularly of advantage when employed with inflatable articles such as balls, rafts, and the like used on the beach, where grit and sand are prone to enter an inflation valve. If, with the valve in the position of Fig. 3, a grain of dirt or sand, for example, were to become lodged between the surface 26 of stem 22 and the surface of body 27 surrounding hole 28, it could readily be dislodged by depressing button 31, thereby allowing the air escaping from the article to blow the dirt away. The full closing of the valve, by depressing button 21, is under positive manual control. It is therefore insured that portion 24 of stem 22 will fully enter and seal opening 28 when desired. Since the valve requires no grease or other lubricant to seal it, sand and dirt are easily removed from the valve parts when necessary.

The valve of the invention, although shown and described as an inflation valve, may also be employed to advantage as a pressure relief valve. When thus used the valve may, for example, be mounted on the inner surface of an inflatable article such as a balloon, with the convex side of valve part 11 facing the interior of the article. When such pressure becomes high enough, it overcomes the friction between portion 26 of stem 22 and the tendency of body 27 to remain generally flat, and thereupon thrusts part 27 longitudinally of stem 22 and thus opens hole 28.

Although only a limited number of embodiments of the invention have been illustrated in the accompanying drawings and described in the foregoing specification, it is to be expressly understood that various changes, such as in the relative dimensions in the parts, materials used, and the like as well as the suggested manner of use of the apparatus of the invention, may be made therein without departing from the spirit and scope of the invention as will now be apparent to those skilled in the art.

What is claimed is:

1. A valve comprising two superimposed plate members which are sealingly connected at their edges, said plate members presenting a space between them, a first one of said plate members being relatively rigid but resiliently flexible and the second of said plate members being relatively soft and flexible, the first plate member having a first opening therethrough permitting the introduction of fluid therethrough into the space between the plate members, the second plate having a second opening therethrough permitting egress of fluid from the space between the plate members, and a stem-like member attached to the first plate member, said stem-like member extending into the space between the plate members and confronting the second opening, the free end of the stem having a diameter relative to the second opening such that it seals such second opening, the plate members being movable toward and away from each other in the central portions thereof so that the stem-like member may be selectively advanced relatively toward and retracted from the second plate member to close and open, respectively, said second opening, the first and second openings being displaced a substantial distance from each other laterally of the valve and being located on opposite sides of the center thereof.

2. A valve comprising two superimposed plate members which are sealingly connected at their edges, said plate members presenting a space between them, a first one of said plate members being relatively rigid but resiliently flexible and the second of said plate members being relatively soft and flexible, the first plate member having a first opening therethrough permitting the introduction of fluid therethrough into the space between the plate members, the second plate having a second opening therethrough permitting egress of fluid from the space between the plate members, and a stem-like member attached to the first plate member, said stem-like member extending into the space between the plate members and confronting the second opening, the free end of the stem having a diameter relative to the second opening such that it seals such second opening, the plate members being movable toward and away from each other in the central portions thereof so that the stem-like member may be selectively advanced relatively toward and retracted from the second plate member to close and open, respectively, said second opening, the relaxed diameter of the second opening being less than the diameter of the free end of the stem-like member, the second plate member being of such construction that it may stably occupy either of two positions, a first such position being that in which the free end of the stem-like member is sealingly received within the second opening, and the second of said positions being that in which the free end of the stem-like member lies inwardly of the relaxed rim of the second opening and functions therewith as a check valve.

3. A valve as defined in claim 2 wherein the stem-like member has a shoulder inwardly of the free end thereof said shoulder being engaged by the second plate member when the latter occupies said first position.

4. A valve as defined in claim 2 wherein the second plate member has a stable substantially relaxed configuration when it occupies said first position and is under tension urging it toward the free end of the stem-like member when it occupies said second position.

5. A valve as defined in claim 4 comprising means to move the second plate member from the second position to the first position.

6. A valve as defined in claim 4 wherein the first plate member has a shallow dome which is convex away from the second plate member, and wherein the second plate member is generally flat and spans the dome of the first plate member.

7. A valve as defined in claim 6 wherein the first plate member is made of relatively stiff resilient material which may be momentarily deformed by compressing the dome to thrust the stem-like member into the second opening.

8. A valve as defined in claim 7 comprising a manually engageable member on the convex surface of the first plate member opposite the stem-like member whereby the dome of the first plate member may be deformed to engage the stem-like member in the second opening.

9. A valve comprising two superimposed plate members of low contour which are sealingly connected at their edges, said plate members presenting a space between them, a first one of said plate members being relatively rigid but resiliently flexible and the second of said plate members being relatively soft and flexible, the first plate member having a first opening therethrough permitting the introduction of fluid therethrough into the space between the plate members, the second plate having a second opening therethrough permitting egress of fluid fom the space between the plate members, and a stem-like member attached to the first plate member, said stem-like member extending into the space between the plate members and confronting the second opening, the size of the free end of the stem-like member being such as to seal the second opening, the plate members being resiliently bowable toward and away from each other so that the stem-like member may be selectively advanced relatively toward and retracted from the second plate member to close and open, respectively, said second opening, the stem-like member and the second opening being located adjacent the centers of the first and second plate members, respectively.

10. An inflation valve comprising two superimposed plate members of low contour which are sealingly connected at their edges, said plate members presenting a space between them, a first one of said plate members being relatively rigid but resiliently flexible and the second of said plate members being relatively soft and flexible, the first plate member having a first opening therethrough permitting the introduction of fluid therethrough into the space between the plate members, the second plate having a second opening therethrough permitting egress of fluid from the space between the plate members, and a stem-like member attached to the first plate member, said stem-like member extending into the space between the plate members and confronting the second opening, the size of the free end of the stem-like member being such as to seal the second opening, the plate members being movable toward and away from each other in the central portions thereof so that the stem-like member may be selectively advanced relatively toward and retract from the second plate member to close and open, respectively, said second opening, the edges flanges which are sealed together.

11. A valve comprising two superimposed plate members which are sealingly connected at their edges, said plate members presenting a space between them, a first one of said plate members being relatively rigid but resiliently flexible and the second of said plate members being relatively soft and flexible, the first plate member having a first opening therethrough permitting the introduction of fluid therethrough into the space between the plate members, the second plate having a second opening therethrough permitting egress of fluid from the space between the plate members, and a stem-like member attached to the first plate member, said stem-like member extending into the space between the plate members and confronting the second opening, the size of the free end of the stem-like member being such as to seal the second opening, the plate members being resiliently bowable toward and away from each other in the central portions thereof so that the stem-like member may be selectively advanced relatively toward and retracted from the second plate member to close and open, respectively, said second opening, the stem-like member and the second opening being located adjacent the centers of the first and second plate members, respectively, the first opening being located on one side of the center of the valve and the second opening being laterally displaced therefrom and located on the other side of the center of the valve.

12. A valve comprising two superimposed plate members which are sealingly connected at their edges, said plate members presenting a space between them, a first one of said plate members being relatively rigid but resiliently flexible and the second of said plate members being relatively soft and flexible, the first plate member having a first opening therethrough permitting the introduction of fluid therethrough into the space between the plate members, the second plate having a second opening therethrough permitting egress of fluid from the space between the plate members, and a stem-like member attached to the first plate member, said stem-like member extending into the space between the plate members and confronting the second opening, the size of the free end of the stem-like member being such as to seal the second opening, the plate members being movable toward and away from each other in the central portions thereof so that the stem-like member may be selectively advanced relatively toward and retracted from the second plate member to close and open, respectively, said second opening, and a manually engageable projection on the second plate member in alignment with the first opening for selectively bulging the second plate member away from the first plate member.

13. A valve as defined in claim 9, wherein the said first and second openings are located on opposite sides of the centers of the first and second plate members, respectively.

References Cited in the file of this patent

UNITED STATES PATENTS

| | | |
|---|---|---|
| 178,253 | Stacy | June 6, 1876 |
| 213,118 | Locke | Mar. 11, 1879 |
| 2,546,678 | Rockwell | Mar. 27, 1951 |
| 2,604,297 | Winstead | July 22, 1952 |